United States Patent
Kim

(10) Patent No.: US 10,793,129 B2
(45) Date of Patent: Oct. 6, 2020

(54) VALVE BLOCK OF ELECTRONIC CONTROL BRAKE SYSTEM

(71) Applicant: MANDO CORPORATION, Gyeonggi-do (KR)

(72) Inventor: Eun-Mi Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 49 days.

(21) Appl. No.: 15/452,720

(22) Filed: Mar. 7, 2017

(65) Prior Publication Data

US 2017/0274883 A1    Sep. 28, 2017

(30) Foreign Application Priority Data

Mar. 28, 2016   (KR) .................. 10-2016-0036540

(51) Int. Cl.
*B60T 8/36*     (2006.01)
*B60T 13/68*    (2006.01)
(Continued)

(52) U.S. Cl.
CPC .......... *B60T 13/686* (2013.01); *B60T 13/145* (2013.01); *B60T 17/04* (2013.01)

(58) Field of Classification Search
CPC ....................................................... B60T 8/368
(Continued)

(56) References Cited

U.S. PATENT DOCUMENTS

| 6,234,199 B1 * | 5/2001 | Nohira | ..................... B60T 8/368 |
| | | | 137/557 |
| 9,428,165 B1 * | 8/2016 | Kim | ........................ B60T 8/368 |

(Continued)

FOREIGN PATENT DOCUMENTS

| CN | 1164209 | 11/1997 |
| CN | 201923113 | 8/2011 |

(Continued)

OTHER PUBLICATIONS

Office Action dated Dec. 28, 2018 for Chinese Patent Application No. 201710168705.8 and its English machine translation by Global Dossier.

*Primary Examiner* — Bradley T King
(74) *Attorney, Agent, or Firm* — Ladas & Parry, LLP

(57) ABSTRACT

Disclosed is a valve block of an electronic control brake system. The valve block of an electronic control brake system includes two hydraulic pressure circuits, and a plurality of accommodation bores at which a plurality of valves, a pump, a low-pressure accumulator, a pressure sensor, and a motor are installed so as to control braking hydraulic pressure delivered to a wheel cylinder installed at each of wheels, and a plurality of flow paths configured to connect the plurality of accommodation bores to one another, wherein a pressure sensor accommodation bore, at which the pressure sensor is installed, is provided with at least one wheel cylinder pressure sensor accommodation bore configured to accommodate the pressure sensor which is connected to each of wheel cylinder ports to detect oil pressure, and the at least one wheel cylinder pressure sensor accommodation bore is connected by a sensor connection flow path formed at the valve block, and connects a selected wheel cylinder port among the wheel cylinder ports, which are connected to wheels, to the at least one wheel cylinder pressure sensor accommodation bore by adjusting lengths of a port connection flow path, which is connected to each of the wheel cylinder ports and the sensor connection flow path.

18 Claims, 9 Drawing Sheets

(51) Int. Cl.
*B60T 13/14* (2006.01)
*B60T 17/04* (2006.01)

(58) Field of Classification Search
USPC .................................................. 303/DIG. 10
See application file for complete search history.

(56) References Cited

U.S. PATENT DOCUMENTS

| | | | |
|---|---|---|---|
| 9,517,757 B2* | 12/2016 | Schlitzkus | B60T 8/368 |
| 2006/0138860 A1* | 6/2006 | Hinz | B60T 8/368 |
| | | | 303/119.3 |
| 2006/0220768 A1* | 10/2006 | Iyatani | B60T 8/368 |
| | | | 335/78 |
| 2007/0096553 A1 | 5/2007 | May et al. | |
| 2010/0276925 A1* | 11/2010 | Bareiss | B60T 8/368 |
| | | | 285/125.1 |
| 2011/0062776 A1* | 3/2011 | Fischbach-Borazio | |
| | | | B60T 8/368 |
| | | | 303/116.1 |
| 2014/0366524 A1* | 12/2014 | Schlitzkus | B60T 8/368 |
| | | | 60/591 |
| 2015/0298675 A1* | 10/2015 | Mayr | B60T 8/368 |
| | | | 92/169.1 |
| 2017/0072925 A1* | 3/2017 | Mayr | B60T 8/368 |
| 2018/0312151 A1* | 11/2018 | Yamaguchi | B60T 8/34 |

FOREIGN PATENT DOCUMENTS

| | | |
|---|---|---|
| CN | 105365803 | 3/2016 |
| KR | 10-2005-0067154 | 6/2005 |
| KR | 10-2010-0057889 | 6/2010 |
| KR | 10-2011-0014204 | 2/2011 |

\* cited by examiner

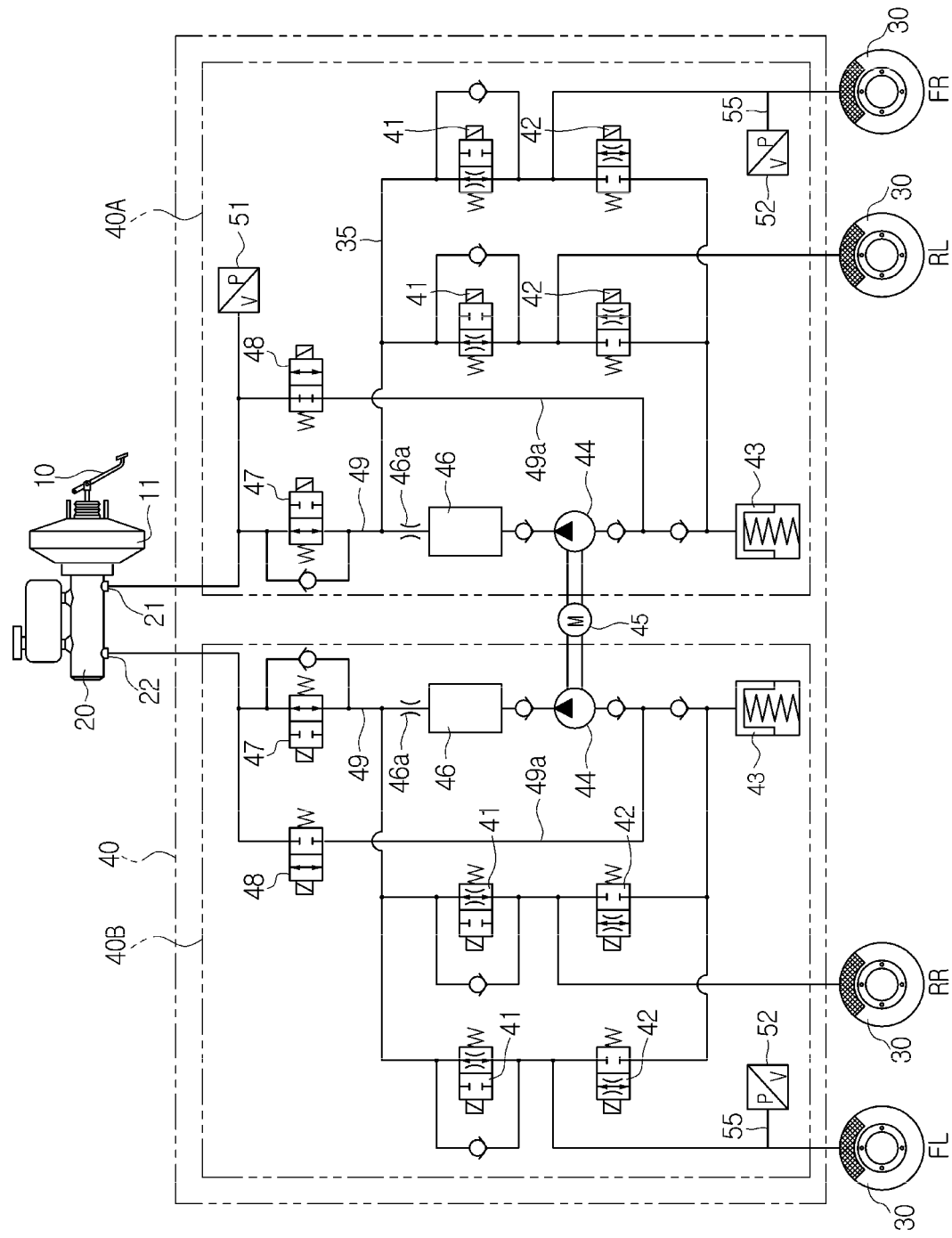
[FIG 1]

[FIG 2]
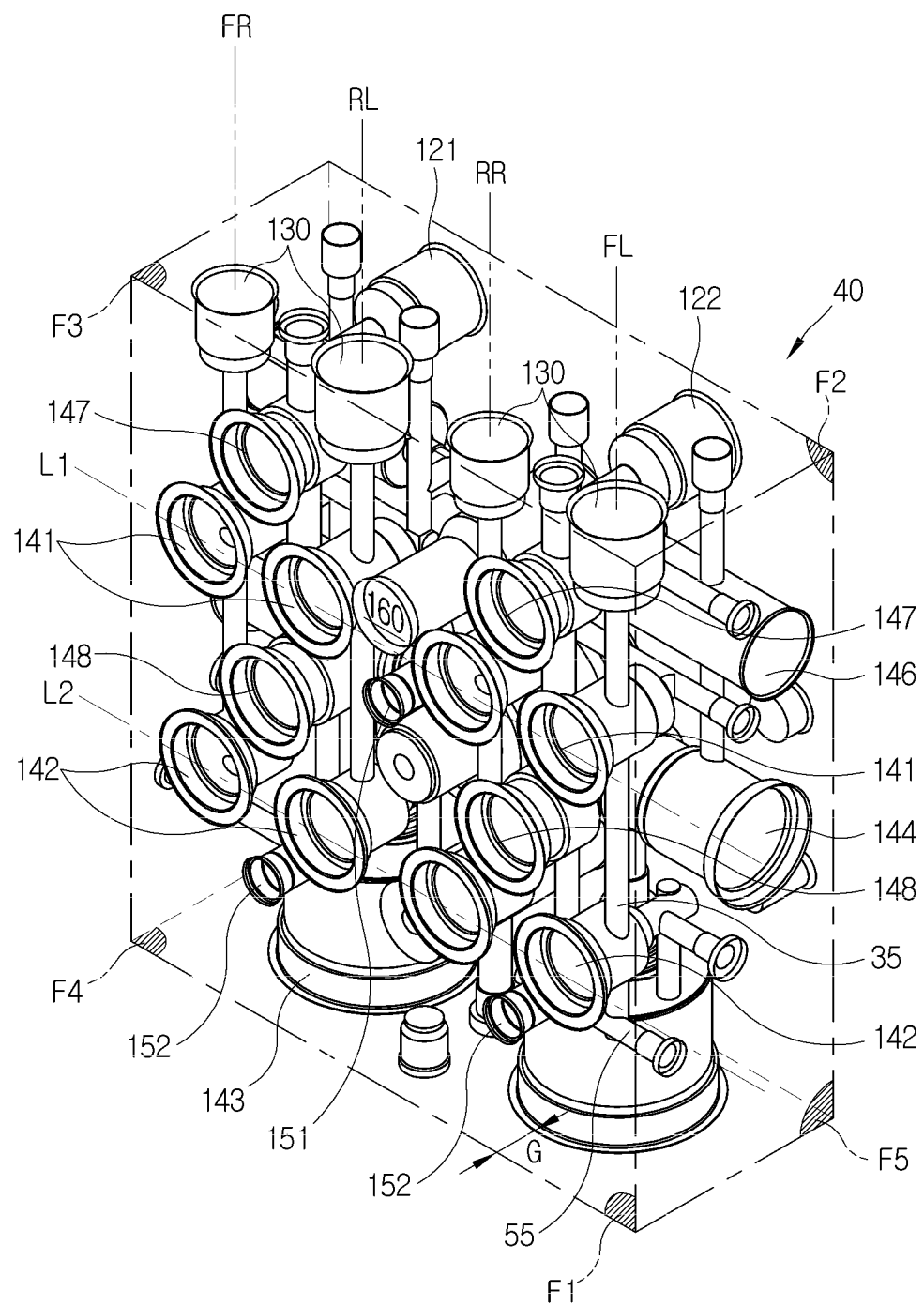

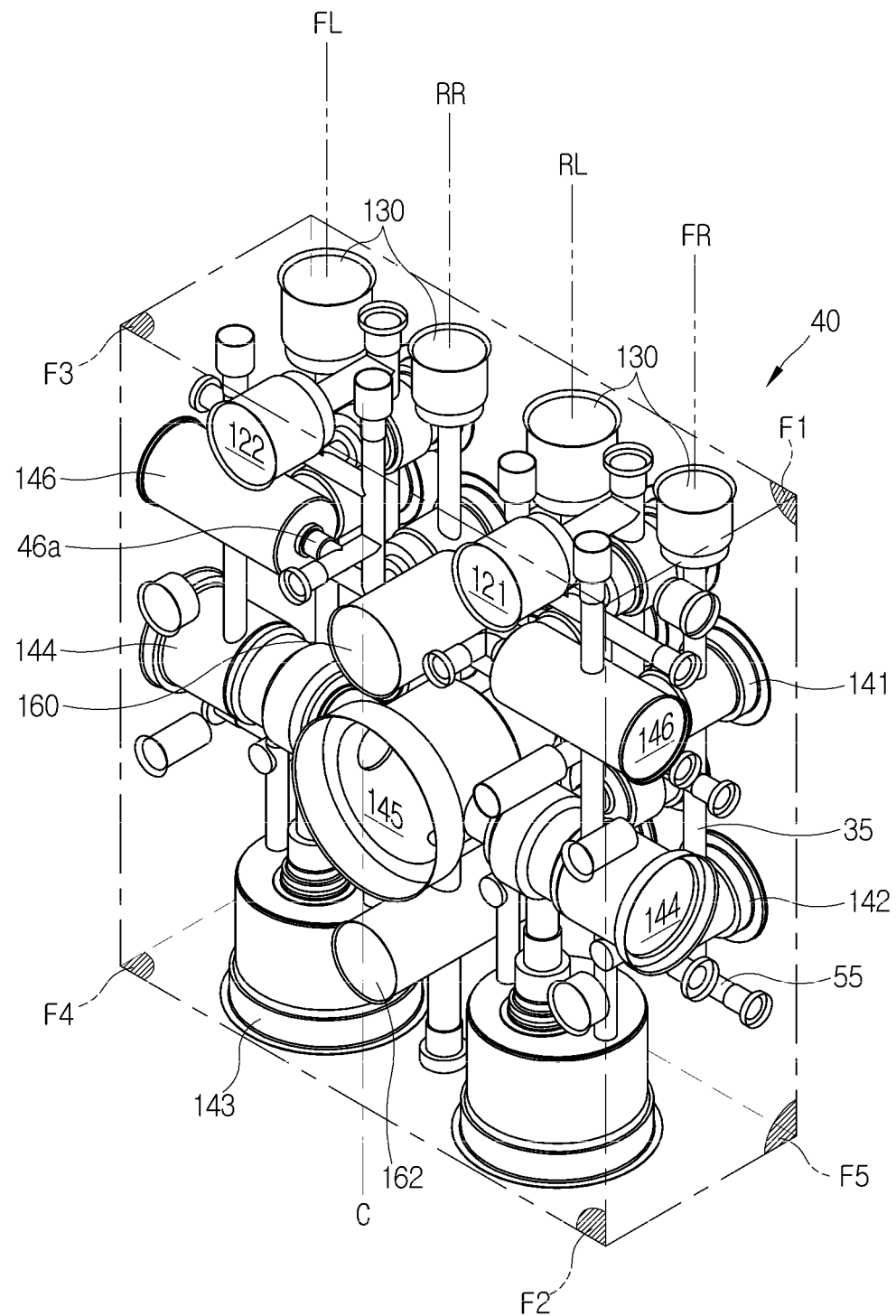
[FIG 3]

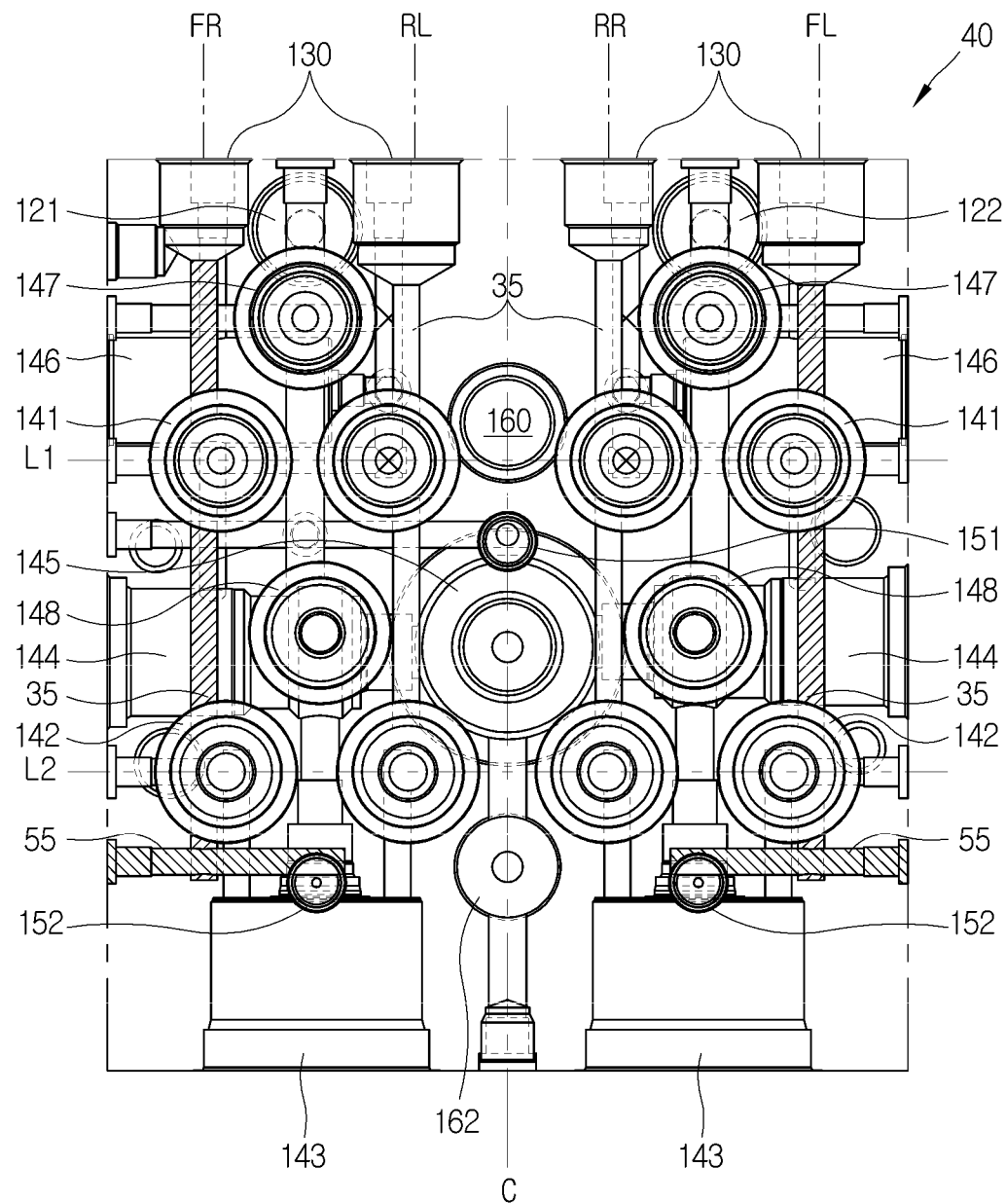
【FIG 4】

[FIG 5]
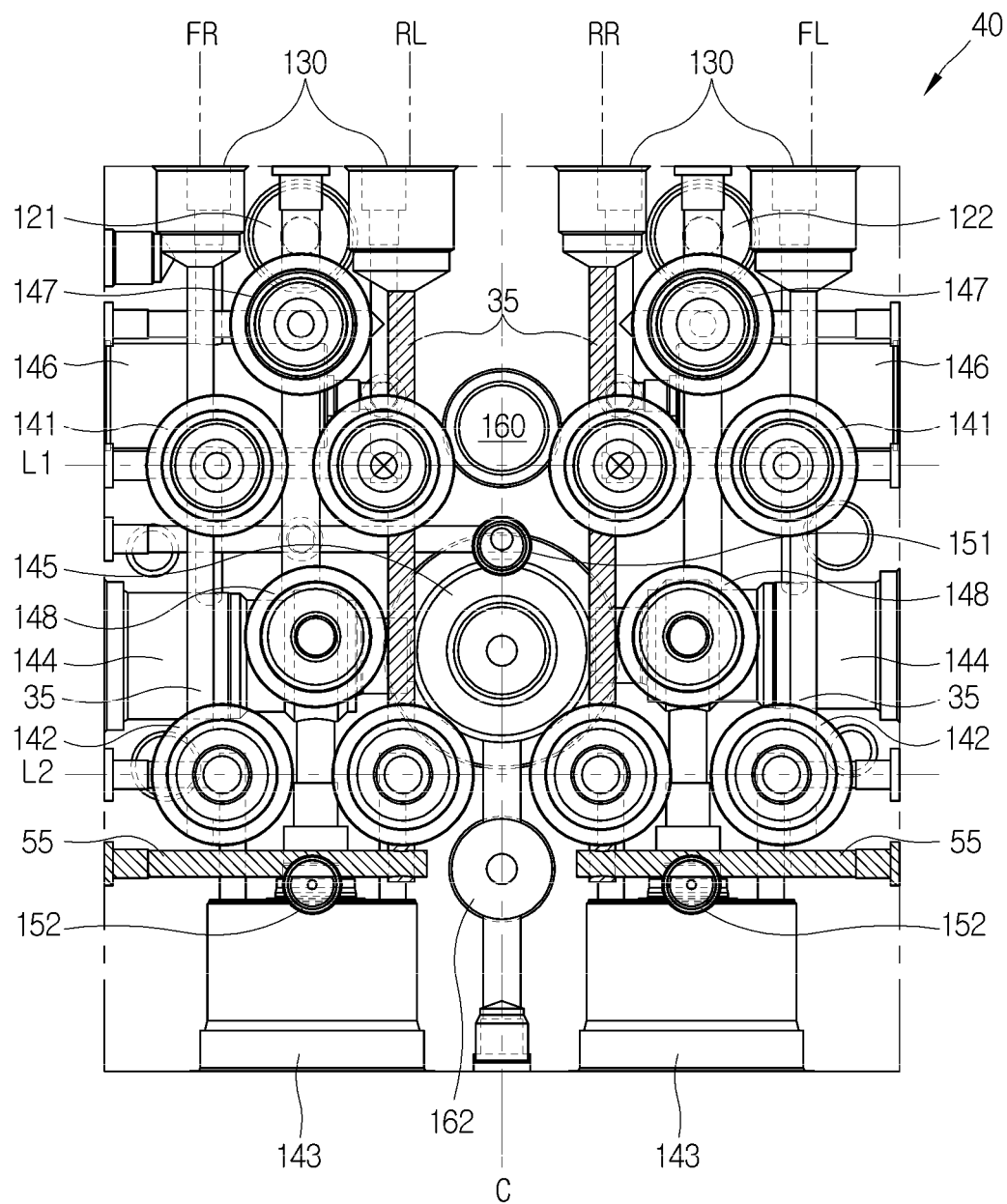

[FIG 6]
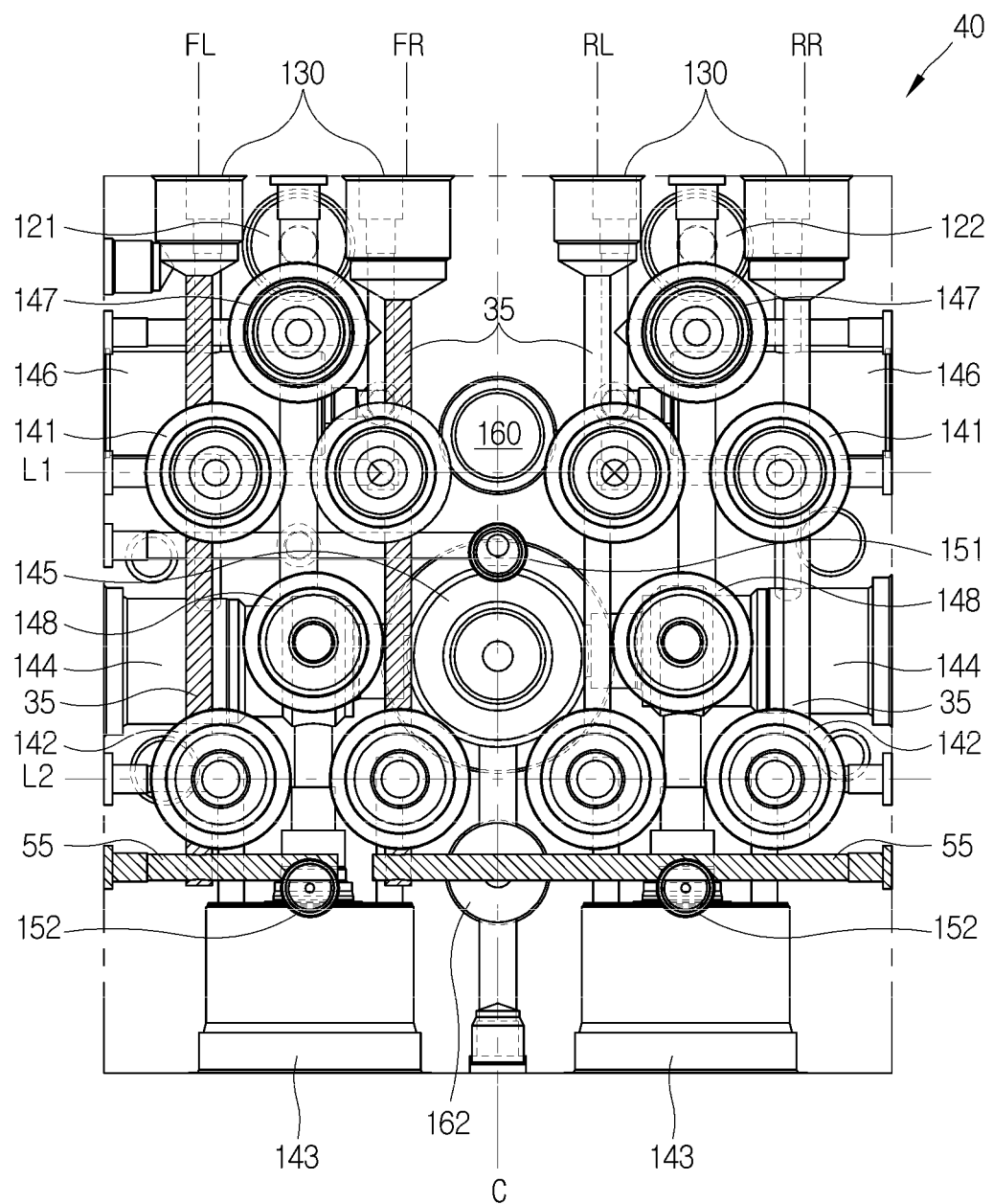

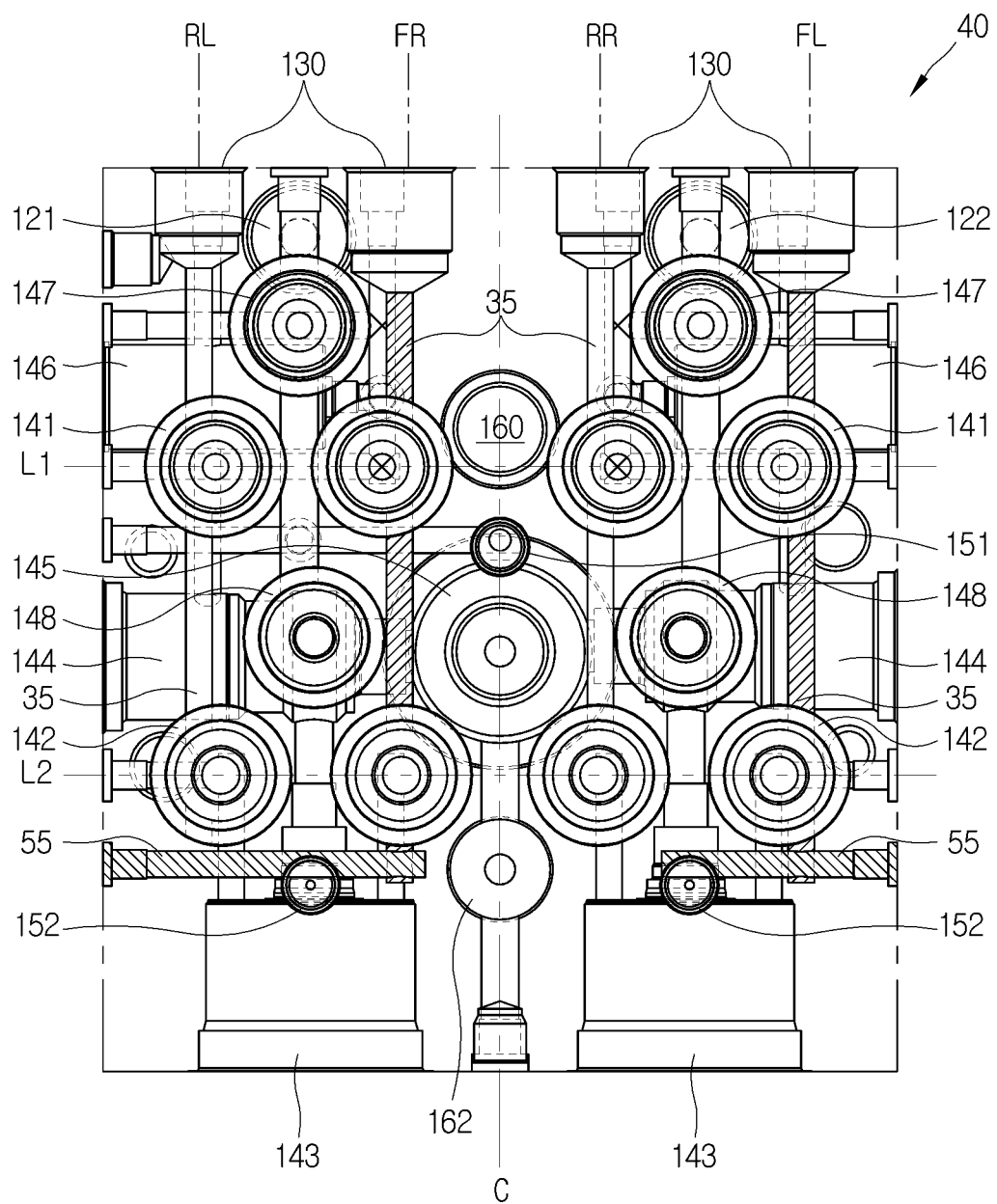

[FIG 8]
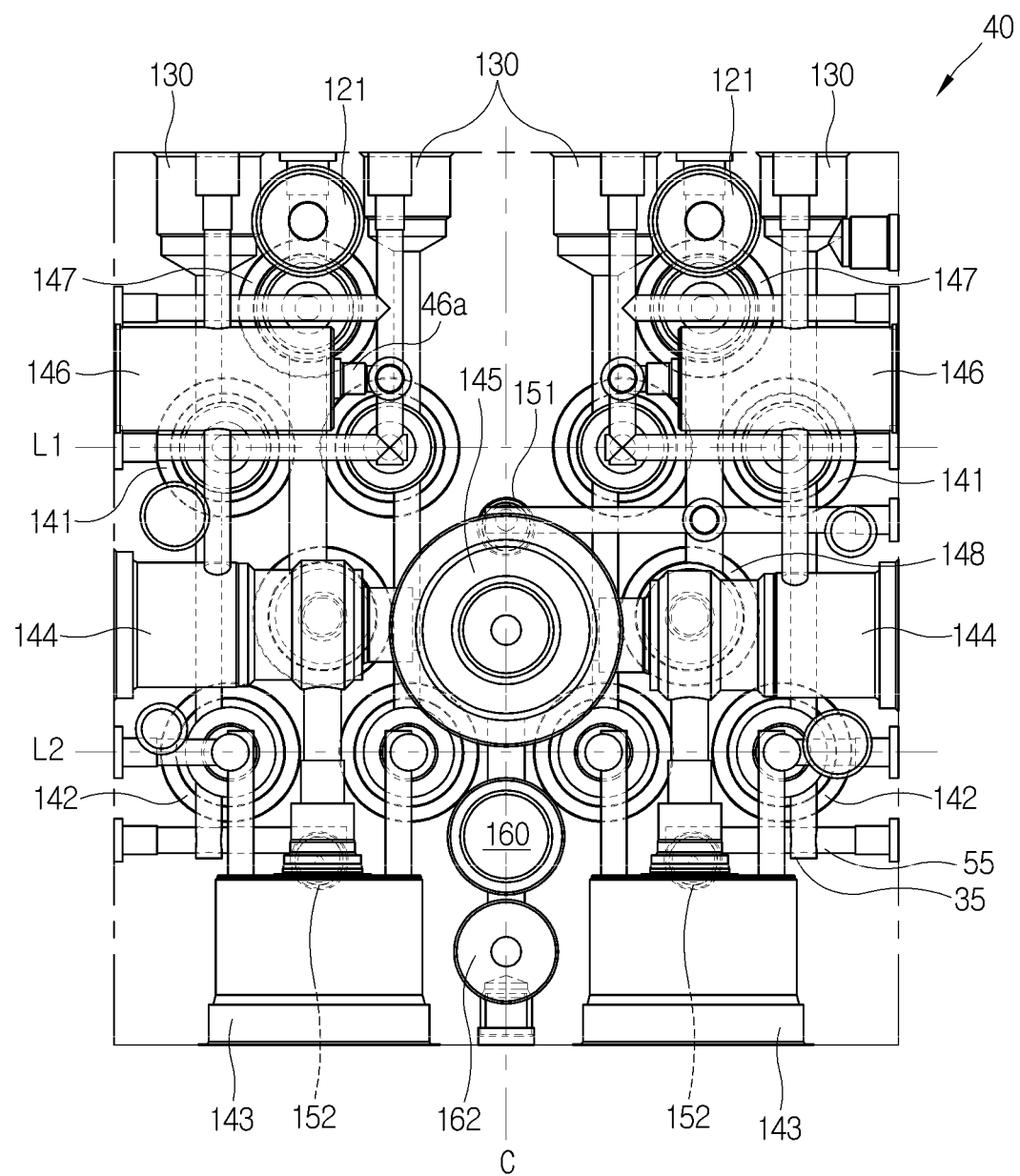

[FIG 9]
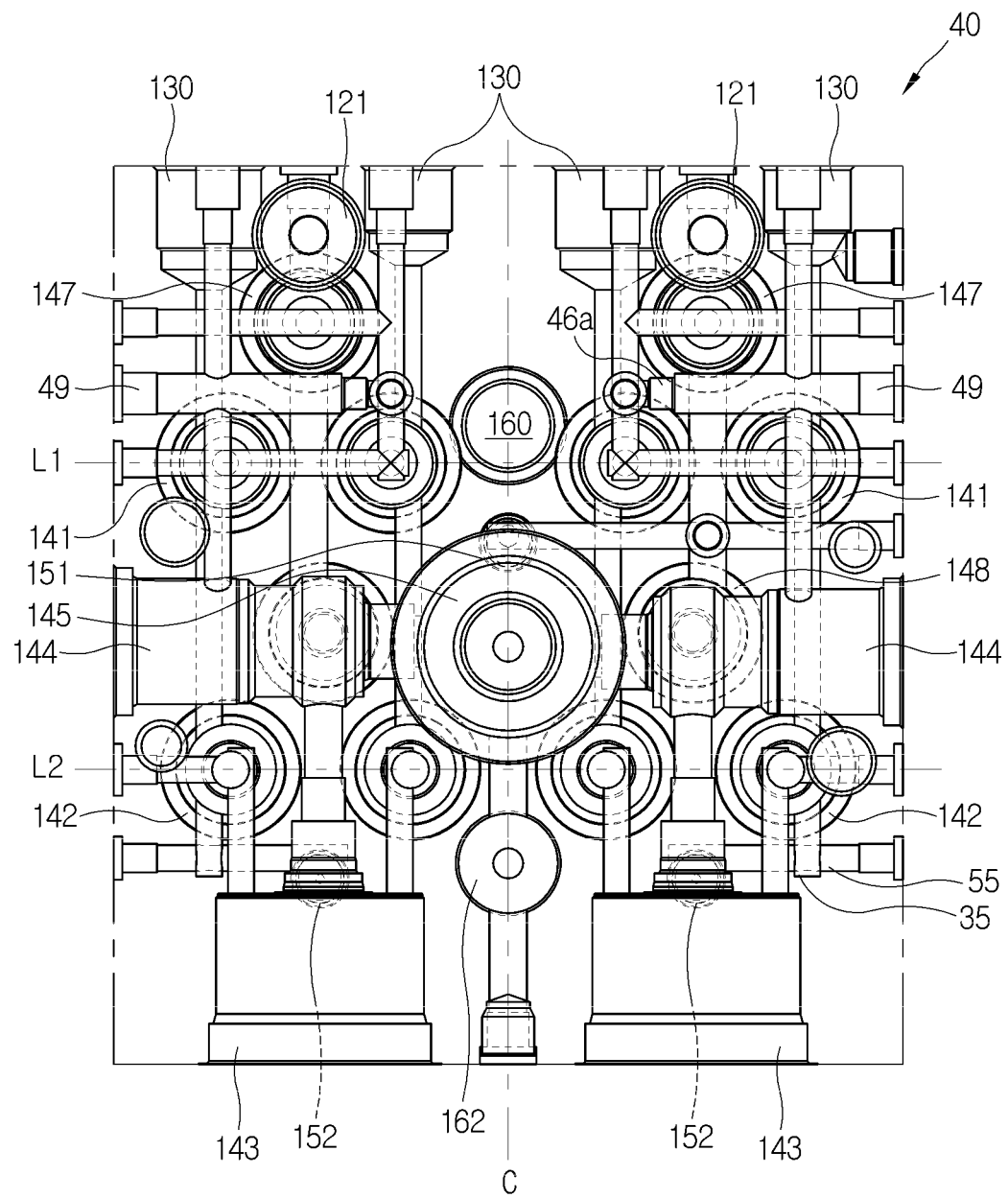

VALVE BLOCK OF ELECTRONIC CONTROL BRAKE SYSTEM

This application claims the benefit of Korean Patent Application No. 2016-0036540, filed on Mar. 28, 2016 in the Korean Intellectual Property Office, the disclosure of which is incorporated herein by reference.

BACKGROUND

1. Field

Embodiments of the present disclosure relate to a valve block, and more particularly, to a valve block of an electronic control brake system for electronically controlling braking pressure in a hydraulic brake system.

2. Description of the Related Art

An electronic control brake system is provided to efficiently prevent a slip phenomenon which may occur upon a braking operation, a sudden unintended acceleration, or a sudden acceleration of a vehicle, and generally includes a valve block for adjusting braking hydraulic pressure and an electronic control unit for controlling the valve block as well as a booster device, a master cylinder, and a wheel cylinder of a brake system for a vehicle.

A plurality of solenoid valves (that is, normally open (NO) type and normally closed (NC) type valves) for controlling braking hydraulic pressure which is delivered to a wheel cylinder provided at each of wheels, a low-pressure accumulator for temporarily storing oil discharged from the wheel cylinder, a pair of pumps driven by a motor, a shuttle valve and a traction control valve respectively provided at an inlet side and an outlet side of each of the pumps, and the like are installed inside a valve block of a rectangular parallelepiped made of aluminum.

Also, a pressure sensor for measuring pressure is installed at the valve block. This pressure sensor is configured with a master cylinder pressure sensor for measuring hydraulic pressure generated from the master cylinder, and a wheel cylinder pressure sensor for measuring hydraulic pressure at each of the wheels.

To compactly install a plurality of components, in such a valve block, a plurality of valve accommodation bores, a pump accommodation bore, a motor accommodation bore, a low-pressure accumulator accommodation bore, ports for connecting the master cylinder to the wheel cylinder, an accommodation bore of the pressure sensor for measuring pressure, and a plurality of flow paths connected to each of the ports and the accommodation bores to direct a flow direction of hydraulic pressure are manufactured.

Meanwhile, to attenuate pressure pulsation of oil, which is pressurized and discharged by an operation of the pump, a pulsation attenuation device selectively connected to the outlet side of the pump is mounted on the valve block.

However, the conventional valve block unnecessarily has a space, which is not used, in addition to a space in which a plurality of components are disposed so that improvement on an arrangement structure of the components is required, and particularly, an installation position of the pressure sensor for measuring oil pressure of the wheel cylinder is fixed so that a position of a wheel cylinder, which is measurable, is determined according to the installation position. That is, since a fixed installation position of the pressure sensor and a flow path connected to the pressure sensor are restrictedly formed, the variety with respect to a formation position of a port of a wheel cylinder connected to each wheel is not secured. This causes problems in that compatibility between various hydraulic brake systems is degraded and only a restricted pressure measurement position is provided.

Also, when a pulsation attenuation device is formed at a valve block, a flow path structure inside the valve block is changed so that there is a problem in that the valve block provided with the pulsation attenuation device is difficult to be compatible with a valve block not provided with the pulsation attenuation device.

PRIOR ART DOCUMENT

Patent Document (Patent Document) Korean Patent Application Publication No. 2010-0057889 (ROBERT BOSCH GMBH), Jun. 1, 2010.

SUMMARY

Therefore, it is an aspect of the present disclosure to provide a valve block of an electronic control brake system, which is capable of enabling a required connection between a wheel cylinder and a pressure sensor irrespective of a connection arrangement position of the wheel cylinder installed at each of wheels.

Also, it is another aspect of the present disclosure to provide a valve block of an electronic control brake system, which is capable of implementing the same flow path irrespective of whether a pulsation attenuation device is provided, thereby improving compatibility without size variance.

In addition, it is still another aspect of the present disclosure to provide a valve block of an electronic control brake system, which is capable of optimizing a size of the valve block by utilizing a space, which is not used, inside the valve block.

Additional aspects of the disclosure will be set forth in part in the description which follows and, in part, will be obvious from the description, or may be learned by practice of the disclosure.

In accordance with one aspect of the present disclosure, a valve block of an electronic control brake system, comprising: two hydraulic pressure circuits; and a plurality of accommodation bores at which a plurality of valves, a pump, a low-pressure accumulator, a pressure sensor, and a motor are installed so as to control braking hydraulic pressure delivered to a wheel cylinder installed at each of wheels, and a plurality of flow paths configured to connect the plurality of accommodation bores to one another, wherein a pressure sensor accommodation bore, at which the pressure sensor is installed, is provided with at least one wheel cylinder pressure sensor accommodation bore configured to accommodate the pressure sensor which is connected to each of wheel cylinder ports to detect oil pressure, and the at least one wheel cylinder pressure sensor accommodation bore is connected by a sensor connection flow path formed at the valve block, and connects a selected wheel cylinder port among the wheel cylinder ports, which are connected to wheels, to the at least one wheel cylinder pressure sensor accommodation bore by adjusting lengths of a port connection flow path, which is connected to each of the wheel cylinder ports and the sensor connection flow path.

The at least one wheel cylinder pressure sensor accommodation bore is provided at each of two hydraulic pressure circuits which is divided into left and right sides based on a center of the valve block in a vertical direction, the wheel cylinder ports are arranged on an upper surface of the valve block and are respectively connected to a front right wheel, a rear left wheel, a rear right wheel, and a front left wheel in a direction from left to right, and the sensor connection flow path is formed at each of both lateral surfaces of the valve block in a direction facing each other toward an inside of the valve block, wherein, when the at least one wheel cylinder pressure sensor accommodation bore is connected to each of the front wheels, a left sensor connection flow path of the sensor connection flow paths, which are formed at the both lateral surfaces of the valve block, is connected to a port connection flow path, which is connected to a first wheel cylinder port among the wheel cylinder ports provided at the upper surface of the valve block, thereby being connected to the at least one wheel cylinder pressure sensor accommodation bore located in the left side, and a right sensor connection flow path is connected to a fourth wheel cylinder port thereamong, thereby being connected to the at least one wheel cylinder pressure sensor accommodation bore located in the right side.

The at least one wheel cylinder pressure sensor accommodation bore is provided at each of two hydraulic pressure circuits which is divided into left and right sides based on a center of the valve block in a vertical direction, the wheel cylinder ports are arranged on an upper surface of the valve block and are respectively connected to a front right wheel, a rear left wheel, a rear right wheel, and a front left wheel in a direction from left to right, and the sensor connection flow path is formed at each of both lateral surfaces of the valve block in a direction facing each other toward an inside of the valve block, wherein, when the at least one wheel cylinder pressure sensor accommodation bore is connected to each of the rear wheels, a left sensor connection flow path of the sensor connection flow paths, which are formed at the both lateral surfaces of the valve block, is connected to a port connection flow path, which is connected to a second wheel cylinder port among the wheel cylinder ports provided at the upper surface of the valve block, thereby being connected to the at least one wheel cylinder pressure sensor accommodation bore located in the left side, and a right sensor connection flow path is connected to a third wheel cylinder port thereamong, thereby being connected to the at least one wheel cylinder pressure sensor accommodation bore located in the right side.

The at least one wheel cylinder pressure sensor accommodation bore is provided at each of two hydraulic pressure circuits which is divided into left and right sides based on a center of the valve block in a vertical direction, the wheel cylinder ports are arranged on an upper surface of the valve block and are respectively connected to a front left wheel, a front right wheel, a rear left wheel, and a rear right wheel in a direction from left to right, and the sensor connection flow path is formed at each of both lateral surfaces of the valve block in a direction facing each other toward an inside of the valve block, wherein, when the at least one wheel cylinder pressure sensor accommodation bore is connected to each of two wheels arranged on any one hydraulic pressure circuit, which is selected from the two hydraulic pressure circuits, the sensor connection flow paths formed at the both lateral surfaces of the valve block are manufactured to be connected to a port connection flow path, which is connected to a wheel cylinder port arranged at the selected hydraulic pressure circuit so that a pair of wheel cylinder pressure sensor accommodation bores are connected to two wheel cylinder ports on the selected any one hydraulic pressure circuit.

The at least one wheel cylinder pressure sensor accommodation bore is provided at each of two hydraulic pressure circuits which is divided into left and right sides based on a center of the valve block in a vertical direction, the wheel cylinder ports are arranged on an upper surface of the valve block and are respectively connected to a rear left wheel, a front right wheel, a rear right wheel, and a front left wheel in a direction from left to right, and the sensor connection flow path is formed at each of both lateral surfaces of the valve block in a direction facing each other toward an inside of the valve block, wherein, when the at least one wheel cylinder pressure sensor accommodation bore is connected to each of the front wheels, a left sensor connection flow path of the sensor connection flow paths, which are formed at the both lateral surfaces of the valve block, is connected to a port connection flow path, which is connected to a second wheel cylinder port among the wheel cylinder ports provided at the upper surface of the valve block, thereby being connected to the at least one wheel cylinder pressure sensor accommodation bore located in the left side, and a right sensor connection flow path is connected to a fourth wheel cylinder port thereamong, thereby being connected to the at least one wheel cylinder pressure sensor accommodation bore located in the right side.

The accommodation bores, at which a normally open (NO) type valve, a normally closed (NC) type valve, a traction control valve, a shuttle valve, and a pressure sensor are installed, are formed at a front surface of the valve block, accommodation bores into which the motor and a motor connector are inserted, and a master cylinder connector which is connected to a master cylinder, are formed at a rear surface of the valve block, a pump accommodation bore, in which the pump is accommodated, is formed at each of both lateral surfaces of the valve block, a pair of low-pressure accumulator accommodation bores are formed on a lower surface of the valve block, and the wheel cylinder port, which is connected to each of the wheels, is formed at an upper surface of the valve block.

On the front surface of the valve block, a plurality of NO valve accommodation bores respectively configured to accommodate a plurality of NO valves are arranged at a first valve row, and a plurality of NC valve accommodation bores respectively configured to accommodate a plurality of NC valves are arranged at a second valve row, and a pair of traction control valve accommodation bores are formed at an upper side of the first valve row and are arranged in parallel therewith, and a pair of shuttle valve accommodation bores are formed between the first valve row and the second valve row and are arranged with the first valve row and the second valve row.

The pair of the shuttle valve accommodation bores are provided to be respectively connected to a suction side of the pump accommodation bore and the master cylinder connector.

The pump accommodation bore is formed to be located between the first valve row and the second valve row, and is symmetrically formed at both sides based on the motor accommodation bore.

The pressure sensor accommodation bore is provided with a master cylinder pressure sensor accommodation bore configured to accommodate a master cylinder pressure sensor for detecting oil pressure of the master cylinder, and a wheel cylinder pressure sensor accommodation bore configured to accommodate a wheel cylinder pressure sensor for detecting oil pressure of the wheel cylinder, the master cylinder pressure sensor accommodation bore is provided between the first valve row and the pair of the shuttle valve accommodation bores, and the wheel cylinder pressure sensor accommodation bore is provided at a lower side of the second valve row.

The wheel cylinder pressure sensor accommodation bore is made of one pair to be provided at each of the two hydraulic pressure circuit, and the sensor connection flow paths connected to the pair of the wheel cylinder pressure sensor accommodation bores are formed on the both lateral surfaces of the valve block in a direction facing to each other toward an inside of the valve block.

The sensor connection flow paths are formed to be located at a gap between the low-pressure accumulator accommodation bore and the front surface of the valve block.

The wheel cylinder ports are arranged to be located adjacent to the front surface of the valve block.

A damping bore is further formed at each of the both lateral surfaces of the valve block, wherein the damping bore is formed on an upper side of the pump accommodation bore and is arranged in parallel therewith.

The damping bore is arranged between the first valve row and the shuttle valve.

A suction side of the damping bore is connected to an outlet side of the pump accommodation bore, and an orifice is formed at an outlet side of the damping bore and is connected to a traction control valve accommodation bore.

An orifice is formed at a hydraulic flow path connected to an outlet side of the pump accommodation bore, and the hydraulic flow path is connected to a traction control valve accommodation bore, thereby being connected to a shuttle valve accommodation bore through the traction control valve.

The motor accommodation bore is arranged between a pair of pump accommodation bores, and the motor connector accommodation bore is formed at an upper side or a lower side of the motor accommodation bore.

The motor accommodation bore and the motor connector are arranged in a vertical direction based on a center of the valve block.

A water leakage bore is further formed and arranged at a gap between the pair of low-pressure accumulator accommodation bores on the rear surface of the valve block.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a hydraulic pressure circuit diagram illustrating an electronic control brake system according to one embodiment of the present disclosure;

FIG. 2 is a perspective view of a valve block of an electronic control brake system according to one embodiment of the present disclosure;

FIG. 3 is a perspective view illustrating a rear side of the valve block shown in FIG. 2;

FIG. 4 shows a plan view of a state in which a wheel cylinder port and a wheel cylinder pressure sensor accommodation bore which are formed in the valve block of the electronic control brake system according to one embodiment of the present disclosure are connected to each other;

FIG. 5 is a plan view of a state in which a wheel cylinder port and a wheel cylinder pressure sensor accommodation bore according to another embodiment of the present disclosure are connected to each other;

FIG. 6 is a plan view of a state in which a wheel cylinder port and a wheel cylinder pressure sensor accommodation bore according to another embodiment of the present disclosure are connected to each other;

FIG. 7 is a plan view of a state in which a wheel cylinder port and a wheel cylinder pressure sensor accommodation bore according to another embodiment of the present disclosure are connected to each other;

FIG. 8 is a perspective view of a valve block of an electronic control brake system according to one in accordance with another embodiment of the present disclosure;

FIG. 9 is a perspective view of a valve block of an electronic control brake system according to one in accordance with another embodiment of the present disclosure.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also sizes of components may be somewhat exaggerated to help understanding.

FIG. 1 is a hydraulic pressure circuit diagram illustrating an electronic control brake system according to one preferred embodiment of the present disclosure.

Referring to the drawing, an electronic control brake system according to the present disclosure is provided with a valve block 40 in which hydraulic pressure circuits 40A and 40B are formed, wherein the hydraulic pressure circuits 40A and 40B control braking hydraulic pressure, which is formed through a booster 11 and a master cylinder 20 in association with a brake pedal 10, to be delivered to a wheel cylinder 30 installed at each of wheels FL, FR, RL, and RR. At this point, the hydraulic pressure circuits 40A and 40B are configured with a first hydraulic pressure circuit 40A, which connects a first port 21 of the master cylinder 20 to the wheel cylinder 30 provided at each of the two wheels FR and RL to control delivery of hydraulic pressure, and a second hydraulic pressure circuit 40B, which connects a second port 22 of the master cylinder 20 to the wheel cylinder 30 provided at each of the remaining two wheels FL and RR to control delivery of hydraulic pressure. Such first and second hydraulic pressure circuits 40A and 40B are compactly provided in the valve block 40.

Each of the first hydraulic pressure circuit 40A and the second hydraulic pressure circuit 40B is provided with a plurality of solenoid valves 41 and 42 configured to control braking hydraulic pressure which is delivered to the two wheel cylinders 30, a low-pressure accumulator 43 configured to temporarily store oil discharged from each of the two wheel cylinders 30, a pair of pumps 44 configured to pump oil in the low-pressure accumulator 43 or the master cylinder 20, a motor 45 configured to drive the pump 44, a pulsation attenuation device 46 having an orifice 46a disposed at an outlet side of the pulsation attenuation device 46 and configured to attenuate pressure pulsation of oil pressurized and discharged by an operation of the pump 44, and a hydraulic flow path 49 configured to connect hydraulic pressure, which is discharged from the pulsation attenuation device 46 or generated from the master cylinder 20, to be selectively delivered to the wheel cylinder 30 or a suction side of the pump 44.

That is, as shown in the drawing, the plurality of solenoid valves 41 and 42, the low-pressure accumulator 43, the pump 44, the pulsation attenuation device 46, the hydraulic flow path 49, and the like are compactly installed at the valve block 40 to configure the first and second hydraulic pressure circuits 40A and 40B.

More particularly, the plurality of solenoid valves 41 and 42 are configured with a normally open (NO) type solenoid valve 41 (hereinafter, referred to as an 'NO valve') which is connected to an upstream side of each of the wheel cylinders 30 and is usually maintained in an open state, and a normally closed (NC) type solenoid valve 42 (hereinafter, referred to as an 'NC valve') which is connected to a downstream side of each of the wheel cylinders 30 and is usually maintained in a closed state. Opening and closing operations of each of these NO and NC valves 41 and 42 are controlled by an electronic control unit (not shown) which senses a vehicle speed through a wheel sensor (not shown) disposed at each of the wheels FL, FR, RL, and RR.

Also, the electronic control brake system is provided with a bypass flow path 49a configured to branch off from the hydraulic flow path 49, which connects the pulsation attenuation device 46 to a traction control valve 47, which will be described below, and connect an outlet side of the master cylinder 20 to an inlet side of the pump 44, and a shuttle valve (ESV) 48, which is usually closed and is open when an opening signal is received, is installed at the bypass flow path 49a. That is, the bypass flow path 49a guides oil of the master cylinder 20 to be suctioned to an inlet of the pump 44 according to an operation of the shuttle valve 48.

In addition, the traction control valve (that is, a TC NO valve) 47 is installed at the hydraulic flow path 49 between the outlet side of the master cylinder 20 and an outlet of the pulsation attenuation device 46, wherein the traction control valve 47 is usually maintained in an open state and is configured to block a flow path when a wheel slip occurs due to a sudden start of a vehicle, and the like and enable braking pressure, which is generated by driving of the pump 44, to be delivered to the wheel cylinder 30 of each of the wheels FL, FR, RL, and RR, thereby implementing braking in a state in which a driver does not pressurize the brake pedal 10.

Meanwhile, a port connection flow path 35, which branches from the hydraulic flow path 49 connecting an outlet end of the pulsation attenuation device 46 to the traction control valve 47, is provided. The port connection flow path 35 is connected to the wheel cylinder 30 of each of the wheels FL, FR, RL, and RR via the NO valve 41 and the NC valve 42.

The pair of the pumps 44 are driven with a phase difference of 180 degrees therebetween based on an axis of the single motor 45, and pressurize oil to the low-pressure accumulator 43 or the master cylinder 20 to pump the oil to the pulsation attenuation device 46.

As described above, in the electronic control brake system according to one embodiment of the present disclosure, it has been shown and described that the pulsation attenuation device 46 is provided at the valve block 40, but is not limited thereto, and alternatively, the electronic control brake system may be configured without providing the pulsation attenuation device 46 and a structure of a flow path is not changed although the pulsation attenuation device 46 is not provided. Such a structure will be described again below.

Meanwhile, an undescribed reference number '51' is a main pressure sensor which is provided to measure hydraulic pressure generated from the master cylinder 20, and serves to sense braking pressure which is delivered to the traction control valve 47 and the shuttle valve 48. Also, a reference number '52' is a wheel cylinder pressure sensor configured to detect hydraulic pressure which is delivered to the wheel cylinder 30, and is connected to a wheel cylinder port (see, '130' of FIG. 2) which is connected to selected two wheels among the wheels FL, FR, RL, and RR.

The valve block, which is provided at the electronic control brake system as described above, will be described in detail with reference to FIGS. 2 and 3.

FIG. 2 is a perspective view of a valve block of an electronic control brake system according to one preferred embodiment of the present disclosure, and FIG. 3 is a perspective view illustrating a rear side of the valve block shown in FIG. 2. At this point, one surface (hereinafter, referred to as a 'front surface F1'), the other surface (hereinafter, referred to as a 'rear surface F2'), an upper surface F3, a lower surface F4, and both lateral surfaces F5, which indicate a direction of the valve block 40, are set as a reference of the valve block 40 shown in FIG. 2 for the purpose of helping understanding of the present disclosure, and they are not limited thereto, and it should be understood that a surface indicating a direction of the valve block 40 may be changed according to a position at which the valve block 40 is installed.

Referring to FIGS. 1 to 3, the valve block 40 has a hexahedral shape. A plurality of accommodation bores 141, 142, 143, 147, 148, 151, and 152, in which the NO valve 41, the NC valve 42, the traction control valve 47, the shuttle valve 48, and the pressure sensors 51 and 52 are respectively installed, are formed at the front surface F1 of the valve block 40, and accommodation bores 145 and 160, into which the motor 45 and a motor connector (not shown) are respectively inserted, and master cylinder connectors 121 and 122 connected to the master cylinder 20 are formed at the rear surface F2 of the valve block 40. Also, a pump accommodation bore 144, in which the pump 44 is accommodated, is formed at each of the both lateral surfaces F5 of the valve block 40, a pair of low-pressure accumulator accommodation bores 143 are formed at the lower surface F4 of the valve block 40, and four wheel cylinder ports 130, which are respectively connected to the wheels FL, FR, RL, and RR, are formed at the upper surface F3 of the valve block 40.

More particularly, the plurality of NO valve accommodation bores 141, which respectively accommodate a plurality of NO valves 41, are formed at a first valve row L1 of the front surface F1 of the valve block 40, and the plurality of NC valve accommodation bores 142, which respectively accommodate a plurality of NC valves 42, are formed at a second valve row L2 of the front surface F1 of the valve block 40. The first and second valve rows L1 and L2 are arranged in parallel with each other, and each of the plurality of NO and NC valve accommodation bores 141 and 142 is formed to be open and is arranged in a horizontal direction on the front surface F1 of the valve block 40.

The traction control valve accommodation bore 147, which accommodates the traction control valve 47, is formed at an upper side of the first valve row L1. The traction control valve accommodation bore 147 is provided in one pair, and is formed to be open and is arranged in the horizontal direction on the front surface F1 of the valve block 40.

The shuttle valve accommodation bore 148, which accommodates the shuttle valve 48, is formed between the first valve row L1 and the second valve row L2. The shuttle valve accommodation bore 148 is provided in one pair, and is formed to be open and is arranged in the horizontal direction on the front surface F1 of the valve block 40. The shuttle valve accommodation bore 148 is connected to a suction side of the pump accommodation bore 144 and the master cylinder connectors 121 and 122.

The pressure sensor accommodation bores 151 and 152, in which the pressure sensors 51 and 52 are respectively formed, are configured with a master cylinder pressure sensor accommodation bore 151 configured to accommodate the master cylinder pressure sensor 51, which is provided to detect oil pressure of the master cylinder 20, and a wheel cylinder pressure sensor accommodation bore 152 configured to accommodate the wheel cylinder pressure sensor 52, which is provided to detect oil pressure of the wheel cylinder 30.

The master cylinder pressure sensor accommodation bore 151 is provided between the first valve row L1 and the pair of the shuttle valve accommodation bores 148. At this point, it has been shown that the master cylinder pressure sensor accommodation bore 151 is connected to the first port 21 of the master cylinder 20, but it is not limited thereto, and the master cylinder pressure sensor accommodation bore 151 may be connected to the second port 22 by changing a formation position of a flow path.

The wheel cylinder pressure sensor accommodation bore 152 is provided at a lower side of the second valve row L2, and is configured with one pair and is provided at each of the two hydraulic pressure circuits 40A and 40B. The wheel cylinder pressure sensor accommodation bore 152 is connected to a sensor connection flow path 55, which is formed at the valve block 40 and is connected to the four wheel cylinder ports 130, and the port connection flow path 35 connected to the four wheel cylinder ports 130, and thus the wheel cylinder pressure sensor 52 detects hydraulic pressure in the wheel cylinder 30. In accordance with one embodiment of the present disclosure, the wheel cylinder pressure sensor accommodation bore 152 may be selectively connected to any one among the wheel cylinder ports 130 installed at the wheels FL, FR, RL, and RR by adjusting lengths of the port connection flow path 35 and the sensor connection flow path 55. That is, the wheel cylinder pressure sensor 52, which is accommodated in each of the pair of the wheel cylinder pressure sensor accommodation bores 152, detects hydraulic pressure of the wheel cylinder 30 installed at any selected one of the wheels FL, FR, RL, and RR.

More particularly, the sensor connection flow path 55 is manufactured and formed to face an inside of the valve block 40 on the both lateral surfaces F5 thereof, thereby being connected to the pair of the wheel cylinder pressure sensor accommodation bores 152. Particularly, the sensor connection flow path 55 is coaxially formed in directions facing each other on the both lateral surfaces F5 of the valve block 40. Also, the sensor connection flow path 55 is formed to be located at a gap G between the low-pressure accumulator accommodation bore 143 and the front surface F1 of the valve block 40. This is because that a predetermined space, that is, the gap G is provided between the low-pressure accumulator accommodation bore 143 and the front surface F1 of the valve block 40 as the low-pressure accumulator accommodation bore 143 is formed to be located adjacent to the rear surface F2 of the valve block 40. Consequently, it may be possible to form the sensor connection flow path 55 without interference with surrounding components.

Also, the port connection flow path 35 is connected to the wheel cylinder port 130, which is connected to each of the wheels FL, FR, RL, and RR, the NO valve accommodation bore 141, and the NC valve accommodation bore 142. At this point, it is preferable for the wheel cylinder port 130 to be formed adjacent to the front surface F1 of the valve block 40 so as to enable the port connection flow path 35 to be easily connected to the NO valve accommodation bore 141, the NC valve accommodation bore 142, and the sensor connection flow path 55. The port connection flow path 35 is manufactured to connect the wheel cylinder port 130, which is connected to a wheel that is selected to measure hydraulic pressure among the wheels FL, FR, RL, and RR, to the sensor connection flow path 55. For example, FIG. 4 shows a plan view of a state in which a wheel cylinder port and a wheel cylinder pressure sensor accommodation bore which are formed in the valve block 40 of the electronic control brake system according to one preferred embodiment of the present disclosure are connected to each other. Referring to FIG. 4, the wheel cylinder ports 130, which are arranged on the upper surface F3 of the valve block 40, are provided to be respectively connected to the front right wheel FR, the rear left wheel RL, the rear right wheel RR, and the front left wheel FL in a direction from left to right. Therefore, when pressure of the wheel cylinders 30 with respect to the front wheels FL and FR is selectively measured, a left sensor connection flow path 55 of the sensor connection flow paths 55, which are respectively formed at the both lateral surfaces F5 of the valve block 40, is formed up to a position at which the wheel cylinder port 130 connected to the front right wheel FR is arranged, and a right sensor connection flow path 55 thereof is formed up to a position at which the wheel cylinder port 130 connected to the front left wheel FL is arranged. That is, the left sensor connection flow path 55 is formed up to a position at which a first wheel cylinder port 130 among the wheel cylinder ports 130, which are arranged on the upper surface F3 in the direction from left to right, is arranged, and the right sensor connection flow path 55 is formed up to a position at which a fourth wheel cylinder port 130 thereamong is arranged. Consequently, the port connection flow path 35 connected to the selected wheel cylinder port 130 is manufactured to extend from the NC valve accommodation bore 142 and thus is connected to the sensor connection flow path 55 which is connected to the wheel cylinder pressure sensor accommodation bore 152. In such a connection structure, the present embodiment shows a case in which hydraulic pressure of each of the wheel cylinders 30 installed at the front wheels FL and FR is detected. However, when hydraulic pressure is selectively measured with respect to each of the wheel cylinders 30 installed at the rear wheels RL and RR, it may be easily implemented as described above by adjusting the lengths of the port connection flow path 35 and the sensor connection flow path 55.

FIG. 5 shows another embodiment in which the wheel cylinder port 130 and the wheel cylinder pressure sensor accommodation bore 152 are connected to each other according to adjustment of the lengths of the sensor connection flow path 55 and the port connection flow path 35. Here, a reference number the same as that in the described above drawings refers to a member performing the same function.

Referring to FIG. 5, the wheel cylinder ports 130, which are arranged on the upper surface F3 of the valve block 40, are provided to be respectively connected to the front right wheel FR, the rear left wheel RL, the rear right wheel RR, and the front left wheel FL in a direction from left to right. The wheel cylinder pressure sensor accommodation bore 152 is connected to each of the wheel cylinders 30 which are respectively connected to the wheels RL, and RR. Therefore, a left sensor connection flow path 55 of the sensor connection flow paths 55, which are respectively formed at the both lateral surfaces F5 of the valve block 40, is formed up to a position at which the wheel cylinder port 130 connected to the rear left wheel RL is arranged, and a right sensor connection flow path 55 thereof is formed up to a position at which the wheel cylinder port 130 connected to the rear right wheel RR is arranged. That is, the left sensor connection flow path 55 is formed up to a position at which a second wheel cylinder port 130 among the wheel cylinder ports 130, which are arranged on the upper surface F3 in a direction from left to right, is arranged, and the right sensor connection flow path 55 is formed up to a position at which a third wheel cylinder port 130 thereamong is arranged. Also, the port connection flow path 35 is formed to be connected to the sensor connection flow path 55, which is located at the wheel cylinder port 130 connected to each of the rear wheels RL and RR, via the NO valve accommodation bore 141 and the NC valve accommodation bore 142. Consequently, pressure of the wheel cylinder 30 installed at each of the rear wheels RL and RR may be detected through the pressure sensor 52 installed at the wheel cylinder pressure sensor accommodation bore 152.

Further, in accordance with still another embodiment of the present disclosure, even when a connection arrangement is different from that between the wheel cylinder port 130 and each of the wheels FL, FR, RL, and RR in the above described embodiments, pressure of a required one among the wheels FL, FR, RL, and RR may be detected by adjusting the lengths of the port connection flow path 35 and the sensor connection flow path 55. For example, FIG. 6 shows a still another connection structure of the present disclosure in which the two wheel cylinder ports 130 are selectively connected to each of the wheels FL, FR, RL, and RR according to adjustment of the lengths of the sensor connection flow path 55 and the port connection flow path 35. Here, a reference number the same as that in the described above drawings refers to a member performing the same function.

Referring to FIG. 6, the wheel cylinder ports 130, which are arranged on the upper surface F3 of the valve block 40, are provided to be respectively connected to the front left wheel FL, the front right wheel FR, the rear left wheel RL, and the rear right wheel RR in a direction from left to right. Therefore, when pressure of the wheel cylinders 30 with respect to the front wheels FL and FR is selectively measured, the sensor connection flow path 55, which is formed at each of the both lateral surfaces F5 of the valve block 40, is formed up to a position at which the wheel cylinder port 130 connected to each of the front wheels FL and FR is arranged, and the port connection flow path 35, which is connected to each of the front wheels FL and FR, is formed to be connected to the sensor connection flow path 55 via the NO valve accommodation bore 141 and the NC valve accommodation bore 142. More particularly, a left sensor connection flow path 55 of the sensor connection flow paths 55, which are respectively formed at the both lateral surfaces F5 of the valve block 40, is formed up to a position at which a first wheel cylinder port 130 among the wheel cylinder ports 130, which are arranged on the upper surface F3 in the direction from left to right, is arranged, and a right sensor connection flow path 55 is formed up to a position at which a second wheel cylinder port 130 thereamong is arranged. Here, even when the pair of the wheel cylinder pressure sensor accommodation bores 152 are respectively provided at the two hydraulic pressure circuits 40A and 40B, pressure with respect to each of two wheels provided to one hydraulic pressure circuit may be measured according to selection of a wheel of which pressure is to be measured. That is, similar to the above described embodiments, even when a sensor connection flow path is formed to measure pressure with respect to each of the front wheels, it may be freely connected through adjustment of lengths of the sensor connection flow path and the port connection flow path according to modification of arrangement connected to each of the wheels.

In addition, as shown in FIG. 7, even when the wheel cylinder ports 130 formed on the upper surface F3 of the valve block 40 are arranged to be respectively connected to the rear left wheel RL, the front right wheel FR, the rear right wheel RR, and the front left wheel FL in a direction from left to right, pressure of a required one among the wheels FL, FR, RL, and RR may be detected by adjusting the lengths of the port connection flow path 35 and the sensor connection flow path 55. For example, when pressure of the wheel cylinders 30 with respect to the front wheels FL and FR is selectively measured, the sensor connection flow path 55, which is formed at each of the both lateral surfaces F5 of the valve block 40, is formed up to a position at which the wheel cylinder port 130 connected to each of the front wheels FL and FR is arranged, and the port connection flow path 35, which is connected to each of the front wheels FL and FR, is formed to be connected to the sensor connection flow path 55 via the NO valve accommodation bore 141 and the NC valve accommodation bore 142.

As described above, irrespective of a structure of arrangement in which the wheel cylinder port 130 and each of the wheels FL, FR, RL, and RR are connected to each other, pressure of a required one among the wheels FL, FR, RL, and RR may be detected by adjusting the lengths of the sensor connection flow path 55 and the port connection flow path 35. Therefore, the valve block 40 may be employed in various vehicles so that high compatibility may be implemented. Meanwhile, it has been described in the above embodiments that the pressure with respect to each of the front wheels FL and FR or the rear wheels RL and RR is detected, but is not limited thereto, and detection of the pressure may be implemented according to selection of a required one among the wheels FL, FR, RL, and RR such as the front left wheel FL and the rear left wheel RL, the front right wheel FR and the rear right wheel RR, or the like by adjusting the lengths of the sensor connection flow path 55 and the port connection flow path 35.

Referring back to FIGS. 1 to 3, the motor accommodation bore 145, at which the motor 45 is installed, is formed on the rear surface F2 of the valve block 40. The motor accommodation bore 145 is formed at a central line C in a vertical direction of the valve block 40, and is arranged between the first valve row L1 and the second valve row L2. Such a motor accommodation bore 145 is formed between the pump accommodation bores 144 and is perpendicular thereto.

Also, the motor connector accommodation bore 160 is provided on the rear surface F2 of the valve block 40 to electrically connect to the motor 45 installed at the motor accommodation bore 145. The motor connector accommodation bore 160 may be formed at an upper side or a lower side of the motor accommodation bore 145 based on the central line C of the valve block 40. As shown in the drawing, the motor connector accommodation bore 160 is formed at the upper side of the motor accommodation bore 145. The motor connector accommodation bore 160 is arranged between the two NO valve accommodation bores 141 of the first valve row L1 and is formed to penetrate the valve block 40.

In addition, a water leakage bore 162 may be formed on the rear surface F2 of the valve block 40. The water leakage bore 162 is connected to the motor accommodation bore 145 and is arranged at the lower side of the second valve row L2. The water leakage bore 162 is configured to enable pump leakage water, which is generated inside the pump accommodation bore 144, to flow in the water leakage bore 162 while the pump leakage water passes inside the motor accommodation bore 145. Consequently, immersion leakage protection and water leakage safety of the hydraulic pressure system are secured, and the water leakage bore 162 is configured with a blind bore for the purpose of securing the immersion leakage protection and the water leakage safety.

The motor accommodation bore 145, the motor connector accommodation bore 160, and the water leakage bore 162 are arranged in a direction of the central line C of the valve block 40. That is, the motor accommodation bore 145, the motor connector accommodation bore 160, and the water leakage bore 162 are arranged in a vertical direction based on a center of the valve block 40.

Meanwhile, FIG. 8 shows a structure in which the motor connector accommodation bore 160 is formed at a lower side of the motor accommodation bore 145. Here, a reference number the same as that in the described above drawings refers to a member performing the same function. That is, a difference is only a change in position of each of the motor connector accommodation bore 160 and the water leakage bore 162 of the valve block 40, which is described above, and the remaining structure is the same as the above described. Referring to FIG. 8, the motor connector accommodation bore 160 is formed at the lower side of the motor accommodation bore 145 so that the water leakage bore 162 is arranged at a lower side of the motor connector accommodation bore 160. At this point, the motor connector accommodation bore 160 and the water leakage bore 162 are formed to be located at a gap which is provided between the pair of the low-pressure accumulator accommodation bores 143. Therefore, the motor connector accommodation bore 160 and the water leakage bore 162 may be easily formed without interference with surrounding components.

Such position changes of the motor connector accommodation bore 160 and the water leakage bore 162 may be implemented without modifying a flow path design inside the valve block 40 and thus assembly availability may be secured.

Referring back to FIGS. 1 to 3, a pair of the master cylinder connectors 121 and 122, which are configured to receive braking hydraulic pressure through the first and second ports 21 and 22 of the master cylinder 20, are formed to be arranged on an upper side of the rear surface F2 of the valve block 40 in a horizontal direction, and a pair of the low-pressure accumulator accommodation bores 143 are formed to be arranged on the lower surface F4 of the valve block 40 in the horizontal direction. At this point, to easily form the above described sensor connection flow path 55, the pair of the low-pressure accumulator accommodation bores 143 are formed to be arranged adjacent to the rear surface F2 of the valve block 40. Also, the plurality of wheel cylinder ports 130 configured to deliver braking hydraulic pressure to the wheel cylinder 30 of each of the wheels FL, FR, RL, and RR are formed on the upper surface F3 of the valve block 40. At this point, the wheel cylinder port 130 is formed to be arranged adjacent to the front surface F1 of the valve block 40.

The pump accommodation bore 144, in which the pump 44 is accommodated, is formed on each of the both lateral surfaces F5 of the valve block 40. The pump accommodation bore 144 is formed between the first valve row L1 and the second valve row L2 in the horizontal direction. That is, the pump accommodation bore 144 is formed to be parallel with a direction of each of the first and second valve rows L1 and L2 on the both lateral surfaces F5 of the valve block 40. The pump accommodation bore 144 is symmetrically formed on the motor accommodation bore 145.

Also, a damping bore 146, at which the pulsation attenuation device 46 is installed, is formed on each of the both lateral surfaces F5 of the valve block 40. The damping bore 146 is formed at an upper side of the pump accommodation bore 144 and is arranged in parallel therewith. Particularly, the damping bore 146 is arranged between the first valve row L1 and the traction control valve accommodation bore 147, a suction side of the damping bore 146 is connected to an outlet side of the pump accommodation bore 144, and the orifice 46a is formed at an outlet side of the damping bore 146 and is connected to the traction control valve accommodation bore 147. At this point, the orifice 46a may be integrally formed with the damping bore 146, and alternatively, it may be connected to the traction control valve accommodation bore 147 through a flow path at which the orifice 46a is formed.

Meanwhile, the damping bore 146 provided inside the valve block 40 is a component which is added by selection of a user, and the valve block 40 not employing the damping bore 146 may be provided. In accordance with one aspect of the present disclosure, even when the damping bore 146 is not provided at the valve block 40, the same structure as that of the valve block 40, which is provided with the damping bore 146, may be provided without modifying a structure of a flow path. For example, referring to FIG. 9, the outlet side of the pump accommodation bore 144 is connected to the traction control valve accommodation bore 147 through the hydraulic flow path 49, and to the shuttle valve accommodation bore 148 through the traction control valve accommodation bore 147. At this point, the orifice 46a is formed at the hydraulic flow path 49. That is, since the hydraulic flow path 49, which is connected to the outlet side of the pump accommodation bore 144, is provided at a space in which the damping bore 146 is formed, the structure of the flow path is not modified even when the damping bore 146 is not provided.

As described above, the NO and NC valve accommodation bores 141 and 142, the pump accommodation bore 144, the wheel cylinder port 130, the master cylinder connectors 121 and 122, the low-pressure accumulator accommodation bore 143, the shuttle valve accommodation bore 148, the traction control valve accommodation bore 147, and the wheel cylinder pressure sensor accommodation bore 152 are respectively arranged at both sides based on the motor accommodation bore 145, that is, the central line C of the valve block 40. This is because that oil pressure delivered from the master cylinder 20 controls braking hydraulic pressure delivered to two wheels through each of the first and second hydraulic pressure circuits 40A and 40B as described above, and thus an optimal arrangement condition is provided.

As a result, the valve block 40 according to one aspect of the present disclosure may implement a connection to the wheel cylinder pressure sensor 52 irrespective of a connection arrangement position of each of the wheels FL, FR, RL, and RR, which is connected to the wheel cylinder port 130, by adjusting the lengths of the sensor connection flow path 55 and the port connection flow path 35. Therefore, various required conditions of arrangement of the wheels FL, FR, RL, and RR, each of which is connected to the wheel cylinder port 130, are satisfied so that high compatibility with various kinds of vehicles may be implemented.

Also, irrespective of whether the damping bore 146 is used to attenuate pressure pulsation, the valve block 40 is implemented to have the same flow path structure so that a size of the valve block 40 is not varied and thus various product selections may be provided within the same size. That is, since a position to which the orifice 46a is applied is same, it may be possible that only the orifice 46a is applied to the flow path or the orifice 46a is applied to the flow path together with a structure of the damping bore 146.

In accordance with a valve block of an electronic control brake system according to one embodiment of the present disclosure, an arrangement structure of components, which are installed to control a flow of hydraulic pressure, is improved and also a space between the components is utilized to prevent a size of the valve block from increasing so that there is an effect in which manufacturing costs may be reduced.

Also, irrespective of a connection arrangement position of a wheel cylinder installed at each of wheels, a required connection between the wheel cylinder and a pressure sensor may be possible and thus an arrangement requirement of each of the wheels may be satisfied so that high compatibility applicable to various kinds of vehicles may be implemented.

In addition, the same flow path may be implemented irrespective of whether a pulsation attenuation device is provided so that there is an advantage in which compatibility between products may be improved. Therefore, a size of the valve block is not varied so that there is an effect in which various product selections may be provided within the same size.

As described above, although the present disclosure has been described by way of a specific embodiment and the accompanying drawings, it is not limited thereto, and it should be understood that numerous other changes and modifications can be devised by those skilled in the art that will fall within the spirit and scope of this disclosure and along with the full range of equivalents to which the appended claims are entitled.

What is claimed is:

1. A valve block of an electronic control brake system, comprising:
    two hydraulic pressure circuits; and
    a plurality of accommodation bores at which a plurality of valves, a pump, a low-pressure accumulator, pressure sensors, and a motor are installed so as to control braking hydraulic pressure delivered to a wheel cylinder installed at each of wheels, and a plurality of flow paths configured to connect the plurality of accommodation bores to one another,
    wherein:
    the plurality of accommodation bores comprise wheel cylinder pressure sensor accommodation bores, each of the wheel cylinder pressure sensor accommodation bores configured to accommodate one of the pressure sensors which is connected to each of wheel cylinder ports to detect oil pressure,
    one of sensor connection flow paths formed at the valve block connects one of the wheel cylinder ports, which are connected to wheels, to at least one of the wheel cylinder pressure sensor accommodation bores,
    a plurality of low-pressure accumulator accommodation bores are formed on a lower surface of the valve block,
    the wheel cylinder pressure sensor accommodation bores are provided at each of the two hydraulic pressure circuits, and the sensor connection flow paths connected to the wheel cylinder pressure sensor accommodation bores are formed on both lateral surfaces of the valve block in a direction facing to each other toward an inside of the valve block, and
    at least one of the sensor connection flow paths is located between one of the low-pressure accumulator accommodation bores and a front surface of the valve block.

2. The valve block of claim 1, wherein the wheel cylinder pressure sensor accommodation bores are provided at each of the two hydraulic pressure circuits which is divided into left and right sides based on a center of the valve block in a vertical direction,
    the wheel cylinder ports are arranged on an upper surface of the valve block and are respectively connected to a front right wheel, a rear left wheel, a rear right wheel, and a front left wheel in a direction from left to right, and
    the sensor connection flow path is formed at each of the both lateral surfaces of the valve block in a direction facing each other toward an inside of the valve block,
    wherein, when the wheel cylinder pressure sensor accommodation bores are connected to each of the rear wheels, a left sensor connection flow path of the sensor connection flow paths, which are formed at the both lateral surfaces of the valve block, is connected to a port connection flow path, which is connected to a second wheel cylinder port among the wheel cylinder ports provided at the upper surface of the valve block, thereby being connected to at least one of the wheel cylinder pressure sensor accommodation bores located in the left side, and a right sensor connection flow path is connected to a third wheel cylinder port thereamong, thereby being connected to at least one of the wheel cylinder pressure sensor accommodation bores located in the right side.

3. The valve block of claim 1, wherein the wheel cylinder pressure sensor accommodation bores are provided at each of the two hydraulic pressure circuits which is divided into left and right sides based on a center of the valve block in a vertical direction,
    the wheel cylinder ports are arranged on an upper surface of the valve block and are respectively connected to a front left wheel, a front right wheel, a rear left wheel, and a rear right wheel in a direction from left to right, and
    the sensor connection flow path is formed at each of the both lateral surfaces of the valve block in a direction facing each other toward an inside of the valve block,
    wherein, when the wheel cylinder pressure sensor accommodation bores are connected to each of two wheels arranged on any one hydraulic pressure circuit, which is selected from the two hydraulic pressure circuits, the sensor connection flow paths formed at the both lateral surfaces of the valve block are manufactured to be connected to a port connection flow path, which is connected to a wheel cylinder port arranged at the selected hydraulic pressure circuit so that a pair of wheel cylinder pressure sensor accommodation bores are connected to two wheel cylinder ports on the selected any one hydraulic pressure circuit.

4. The valve block of claim 1, wherein the wheel cylinder pressure sensor accommodation bores are provided at each of the two hydraulic pressure circuits which is divided into left and right sides based on a center of the valve block in a vertical direction, the wheel cylinder ports are arranged on an upper surface of the valve block and are respectively connected to a rear left wheel, a front right wheel, a rear right wheel, and a front left wheel in a direction from left to right, and the sensor connection flow path is formed at each of the both lateral surfaces of the valve block in a direction facing each other toward an inside of the valve block, wherein, when the wheel cylinder pressure sensor accommodation bores are connected to each of the front wheels, a left sensor connection flow path of the sensor connection flow paths, which are formed at the both lateral surfaces of the valve block, is connected to a port connection flow path, which is connected to a second wheel cylinder port among the wheel cylinder ports provided at the upper surface of the valve block, thereby being connected to at least one of the wheel cylinder pressure sensor accommodation bores located in the left side, and a right sensor connection flow path is connected to a fourth wheel cylinder port thereamong, thereby being connected to at least one of the wheel cylinder pressure sensor accommodation bores located in the right side.

5. The valve block of claim 1, wherein the plurality of accommodation bores comprise a normally open (NO) valve accommodation bore accommodating a NO valve, a normally closed (NC) valve accommodation bore accommodating a NC valve, a traction control valve accommodation bore accommodating a traction control valve, and at least one shuttle valve accommodation bore accommodating at least one shuttle valve, the NO valve accommodation bore, the NC valve accommodation bore, the traction control valve accommodation bore, the shuttle valve accommodation bore and at least one of the pressure sensor accommodation valves are formed at a front surface of the valve block, the accommodation bores into which the motor and a motor connector are inserted, and a master cylinder connector which is connected to a master cylinder, are formed at a rear surface of the valve block, at least one pump accommodation bore, in which the pump is accommodated, is formed at each of the both lateral surfaces of the valve block, and the wheel cylinder port, which is connected to each of the wheels, is formed at an upper surface of the valve block.

6. The valve block of claim 5, wherein the at least one shuttle valve comprises a pair of the shuttle valve accommodation bores provided to be respectively connected to a suction side of the pump accommodation bore and the master cylinder connector.

7. The valve block of claim 5, wherein the wheel cylinder ports are arranged to be located adjacent to the front surface of the valve block.

8. The valve block of claim 5, wherein at least one damping bore is further formed at at least one of the both lateral surfaces of the valve block, wherein the at least one damping bore is formed on an upper side of the pump accommodation bore and is arranged in parallel therewith.

9. The valve block of claim 8, wherein the at least one damping bore is arranged between a first valve row and the at least one shuttle valve.

10. The valve block of claim 8, wherein a suction side of the at least one damping bore is connected to an outlet side of the pump accommodation bore, and an orifice is formed at an outlet side of the at least one damping bore and is connected to the traction control valve accommodation bore.

11. The valve block of claim 5, wherein an orifice is formed at a hydraulic flow path connected to an outlet side of the pump accommodation bore, and the hydraulic flow path is connected to the traction control valve accommodation bore, thereby being connected to the shuttle valve accommodation bore through the traction control valve.

12. The valve block of claim 5, wherein the at least one pump accommodation bores comprises a pair of pump accommodation bores, the motor accommodation bore is arranged between the pair of pump accommodation bores, and the motor connector accommodation bore is formed at an upper side or a lower side of the motor accommodation bore.

13. The valve block of claim 5, wherein the motor accommodation bore and the motor connector are arranged in a vertical direction based on a center of the valve block.

14. The valve block of claim 5, wherein a water leakage bore is further formed and arranged at a gap between two of the low-pressure accumulator accommodation bores on the rear surface of the valve block.

15. A valve block of an electronic control brake system, comprising:

two hydraulic pressure circuits; and a plurality of accommodation bores at which a plurality of valves, a pump, a low-pressure accumulator, pressure sensors, and a motor are installed so as to control braking hydraulic pressure delivered to a wheel cylinder installed at each of wheels, and a plurality of flow paths configured to connect the plurality of accommodation bores to one another, wherein:

the plurality of accommodation bores comprise wheel cylinder pressure sensor accommodation bores, each of the wheel cylinder pressure sensor accommodation bores configured to accommodate one of the pressure sensors which is connected to each of wheel cylinder ports to detect oil pressure, one of sensor connection flow paths formed at the valve block connects one of the wheel cylinder ports, which are connected to wheels, to at least one of the wheel cylinder pressure sensor accommodation bores, a plurality of low-pressure accumulator accommodation bores are formed on a lower surface of the valve block, at least one of the sensor connection flow paths is located at a gap between one of the low-pressure accumulator accommodation bores and a front surface of the valve block, the wheel cylinder pressure sensor accommodation bores are provided at each of the two hydraulic pressure circuits which is divided into left and right sides based on a center of the valve block in a vertical direction, the wheel cylinder ports are arranged on an upper surface of the valve block and are respectively connected to a front right wheel, a rear left wheel, a rear right wheel, and a front left wheel in a direction from left to right, and the sensor connection flow path is formed at each of both lateral surfaces of the valve block in a direction facing each other toward an inside of the valve block, wherein, when the wheel cylinder pressure sensor accommodation bores are connected to each of the front wheels, a left sensor connection flow path of the sensor connection flow paths, which are formed at the both lateral surfaces of the valve block, is connected to a port connection flow path, which is connected to a first wheel cylinder port among the wheel cylinder ports provided at the upper surface of the valve block, thereby being connected to at least one of the wheel cylinder pressure sensor accommodation bores located in the left side, and a right sensor connection flow path is connected to a fourth wheel cylinder port thereamong, thereby being connected to at least one of the wheel cylinder pressure sensor accommodation bores located in the right side.

16. A valve block of an electronic control brake system, comprising:
   two hydraulic pressure circuits; and
   a plurality of accommodation bores at which a plurality of valves, a pump, a low-pressure accumulator, pressure sensors, and a motor are installed so as to control braking hydraulic pressure delivered to a wheel cylinder installed at each of wheels, and a plurality of flow paths configured to connect the plurality of accommodation bores to one another,
   wherein:
   the plurality of accommodation bores comprise wheel cylinder pressure sensor accommodation bores, each of the wheel cylinder pressure sensor accommodation bores configured to accommodate one of the pressure sensors which is connected to each of wheel cylinder ports to detect oil pressure,
   one of sensor connection flow paths formed at the valve block connects one of the wheel cylinder ports, which are connected to wheels, to at least one of the wheel cylinder pressure sensor accommodation bores,
   a plurality of low-pressure accumulator accommodation bores are formed on a lower surface of the valve block,
   the wheel cylinder pressure sensor accommodation bores are provided at each of the two hydraulic pressure circuits, and the sensor connection flow paths connected to the wheel cylinder pressure sensor accommodation bores are formed on both lateral surfaces of the valve block in a direction facing to each other toward an inside of the valve block, and
   on a front surface of the valve block, the accommodation bores comprise:
   a plurality of NO valve accommodation bores respectively configured to accommodate a plurality of NO valves, the NO valve accommodation bores arranged at a first valve row,
   a plurality of NC valve accommodation bores respectively configured to accommodate a plurality of NC valves, the NC valve accommodation bores arranged at a second valve row,
   a pair of traction control valve accommodation bores formed at an upper side of the first valve row and arranged in parallel therewith, and
   a pair of shuttle valve accommodation bores formed between the first valve row and the second valve row and arranged with the first valve row and the second valve row.

17. The valve block of claim 16, wherein a pump accommodation bore is formed to be located between the first valve row and the second valve row, and is symmetrically formed at both sides based on a motor accommodation bore.

18. The valve block of claim 16, wherein the plurality of accommodation bores comprise a master cylinder pressure sensor accommodation bore configured to accommodate a master cylinder pressure sensor for detecting oil pressure of the master cylinder,
   the master cylinder pressure sensor accommodation bore is provided between the first valve row and the pair of the shuttle valve accommodation bores, and
   the wheel cylinder pressure sensor accommodation bore is provided at a lower side of the second valve row.

\* \* \* \* \*